United States Patent [19]

Ohsawa

[11] Patent Number: 4,744,482
[45] Date of Patent: May 17, 1988

[54] PROTECTION ASSEMBLY FOR FUELING INLET FOR MOTOR VEHICLE

[75] Inventor: Hirobumi Ohsawa, Ayase, Japan

[73] Assignee: Ikeda Bussan Co., Ltd., Ayase, Japan

[21] Appl. No.: 69,140

[22] Filed: Jul. 2, 1987

[30] Foreign Application Priority Data

Jul. 4, 1986 [JP] Japan .................................. 61-156278

[51] Int. Cl.⁴ .............................................. B65D 69/00
[52] U.S. Cl. ............................. 220/85 SP; 220/86 R; 220/DIG. 33; 220/85 K; 220/1 V
[58] Field of Search ............... 220/85 R, 85 SP, 85 F, 220/85 H, 85 K, 86 R, DIG. 33, DIG. 24, DIG. 32, 1 V

[56] References Cited

U.S. PATENT DOCUMENTS

| | | | |
|---|---|---|---|
| 3,865,270 | 2/1975 | Petersson | 220/85 SP |
| 4,232,785 | 11/1980 | Lucas | 220/85 SP |
| 4,345,701 | 8/1982 | Walter | 220/85 SP |
| 4,452,581 | 6/1984 | Panehal | 220/85 SP |
| 4,607,400 | 8/1986 | Goodman | 220/85 R |

Primary Examiner—Joseph Man-Fu Moy
Attorney, Agent, or Firm—Foley & Lardner, Schwartz, Jeffery, Schwaab, Mack, Blumenthal & Evans

[57] ABSTRACT

A protection assembly for protecting a body panel as well as a fuel inlet port which is provided in the body panel of a motor vehicle and normally closed by a removable cover cap when refueling of the vehicle is carried out. The assembly comprises a base member destined to be mounted internally in a recess formed in the body panel where the fuel inlet port is provided, which recess is usually covered by a cover member, a supporting member hinged to the base member so as to be unfoldably extended outwardly from the recess in the opened state thereof and serving to support a fueling pistol at the time of refueling the motor vehicle, and a retaining portion formed in the supporting member for serving to hold the removable cap detached from the fuel inlet port.

5 Claims, 4 Drawing Sheets

PROTECTION ASSEMBLY FOR FUELING INLET FOR MOTOR VEHICLE

BACKGROUND OF THE INVENTION

1. Field of the Invention

The present invention relates to an apparatus for protecting a body panel of a motor vehicle when fuel such as gasoline, light oil or the like is poured into an onboard fuel tank through a fuel inlet port by using a fueling gun, pistol or the like tool. More particularly, the invention is concerned with a protection assembly for protecting a car body panel from injuries possibly produced by inadvertent handling of the fueling pistol upon refueling of the car.

2. Description of the Prior Art

The refueling of the motor vehicle is usually performed by using a fueling pistol (i.e. fuel pouring gun) inserted into an fuel inlet port provided ordinarily in the body panel. As is shown in FIG. 1 of the accompanying drawings, the fuel inlet port is usually provided within a recess 2 formed in the body panel 1 of the vehicle on one side thereof. The inlet port 1 is normally closed by a cap 3 and the recess 2 is covered by a cover member 4 so that the recess 2 is concealed from the outer appearance. At the time of refueling, the cever member 4 is opened and the cap 4 is removed. In this state, a tip nozzle 5a of a fueling pistol 5 is inserted into the inlet port 6 to feed the fuel such as gasoline into a fuel tank, as is illustrated in FIG. 2 of the accompanying drawings. In the course of the refueling operation, a part of the fueling pistol 5 such as a frame 5b of a trigger 7 is brought into direct contact with the body panel 1. In this connection, it is a fact frequently observed that the trigger frame 2b or other portion of the fueling pistol 5 strikes on the car body panel 1 due to rough handling, as a result of which the body panel is injured through advasive friction, giving rise to a problem. Besides, no predetermined location is provided for the removed cap 3 and it is usually placed on a corner portion of the rear window or a trunk when the refueling is performed. Consequently, the cap 3 might be left not to be fitted onto the inlet port 6 in the worst case, to another disadvantage.

SUMMARY OF THE INVENTION

It is therefore a first abject of the present invention to provide a protection assembly for protecting a body panel portion of a motor vehicle located in the vicinity of a fuel inlet port against the injury otherwise produced by a fueling means such as the fueling pistol in the course of refueling of the car.

A second object of the present invention is to provide a protection assembly mentioned above which is further capable of managing the cap which is removed from the fueling inlet port in the refueling operation.

In view of the objects mentioned above, there is sprovided according to a general aspect of the invention a protection assembly for protecting a body panel as well as a fuel inlet port provided in the body panel of a motor vehicle and normally closed by a removable closing cap, which assembly comprises a base member destined to be placed internally in a recess provided in the body panel in which the fuel inlet port is provided and which is usually covered by a cover member, a supporting member hinged to the base member so as to be unfoldably extended outwardly from the recess in the opened state thereof, the supporting member serving to support a tool used for refueling through the fuel inlet port, and a retaining portion formed in the supporting member and serving to hold the removable cover cap removed from the fuel inlet port in the refueling operation.

By virtue of the protection assembly of the structure desoribed above, the refueling operation can be carried out in such a manner that after a cover member of the recess is opened to expose the fuel inlet port, the cap is removed and held in the retaining portion, which is then followed by insertion of the tip end of a fueling pistol into the fuel inlet port with the pistol being supported by the supporting member. In this way, the car body panel can be evaded from the direct contact with the fueling pistol in the course of the refueling, whereby the former can be protected from injury. Further, by virture of such arrangement that the location where the cap removed from the fuel inlet port is to be placed is previously defined by the cap retaining portion formed in the supporting member and that the cover member for the recess can not be closed without fitting the cap onto the inlet port after detaching it from the retaining portion because otherwise the supporting member cannot be folded over the base portion, man can never forget to mount again the cap on the fuel inlet port.

DESCRIPTION OF THE PREFERRED EMBODIMENTS

Figure 1:
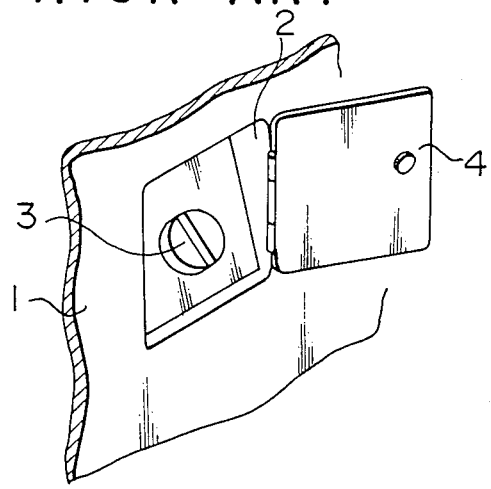
FIG. 1 is a perspectival view showing a peripheral environment of a fuel inlet port of a motor vehicle for illustrating the present state of the art.
Figure 2:
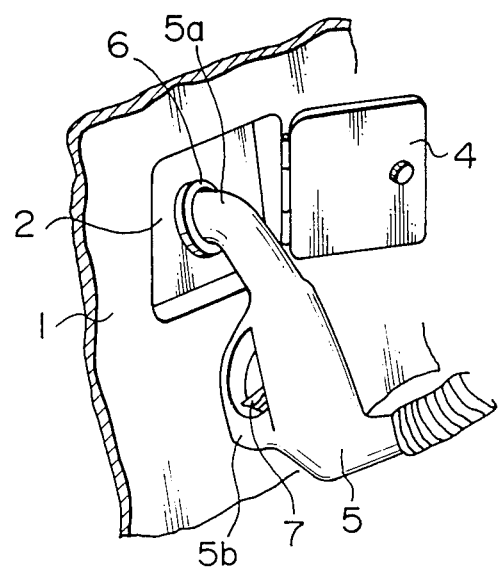
FIG. 2 is a perspective view for illustrating a refueling operation in a hitherto known fuel inlet port structure.

Now, the invention will be described in further detail in conjunction with exemplary or illustrative embodiments thereof by referring to the drawings throughout which like or equivalent parts are denoted by like reference characters.

Figure 3:
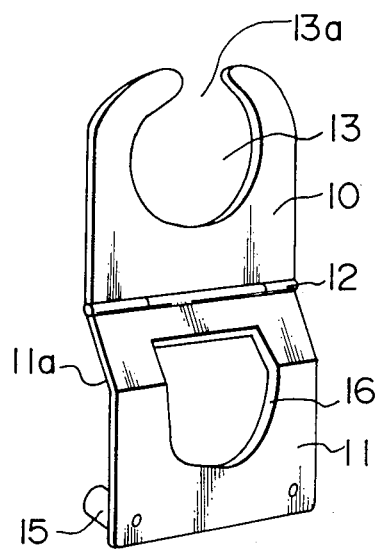
FIG. 3 is a perspective view showing a protection assembly according to an exemplary embodiment of the present invention.

Referring to FIG. 3 showing a protection assembly according to an embodiment of the present invention, a reference numeral 10 denotes a mouting or base member formed of a sheet metal or the like material, and a numeral 12 denotes a supporting member connected pivotally to the mounting or base member 10 by means of a hinge 12 which may be of any appropriate conventional structure. More specifically, the hinged connection can be realized in such a manner in which the base or mounting member 10 and the supporting member 12 may be formed along opposite edges thereof with respective sleeve-like sections which are arrayed alternately in alignment with one another and a pin shaft is inserted into the aligned sleeve sections, to thereby connecting together the mounting base member 10 and the supporting member 12 so that they can be rotated relative to each other.

The mounting base member 10 is formed with a circular aperture 13 and a cut-out portion 13a through which the mounting base member 10 can be mounted on a cylindrial member 14 constituting a fuel inelt port 6 which is usually fitted with a cover cap 3. More specifically, the mounting base member 10 is fitted around a peripheral surface of the cylindrical hollow member 14 at a base portion thereof with resiliency imparted by the cut-out portion 13a and held in the state retained by the cylindrical portion 14 unmovably in the axial direction thereof. In this way, the base member 10 can be mounted within the recess 2.

Figure 5:
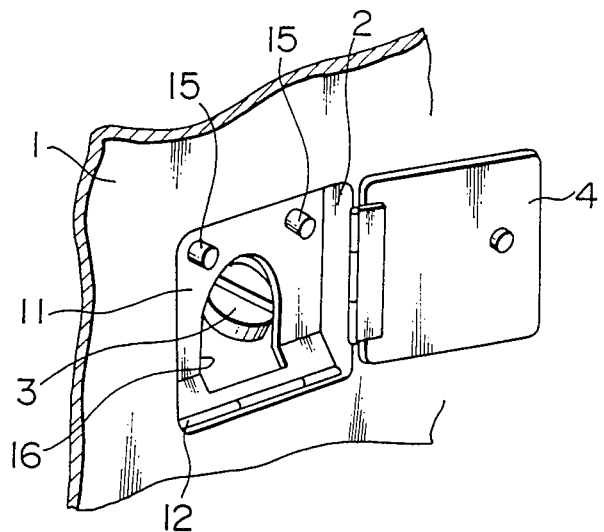
FIG. 5 is a perspective view showing the protection assembly in the inoperative state accommodated within a recess with a cover member therefor being opened.

The supporting member 11 can also be accommodated within the recess 2 in the state folded over the base member 10 around the hinge 12, as is illustrated in FIG. 5. By closing a cover 4, the recess 2 can be concealed. Thus, the protection assembly can be constantly stored within the recess 2. The supporting member 11 has a bent portion 11a formed at a location near to the hinge connection 12 substantially in parallel therewith and a pair of stoppers 15 formed of an elastic material such as rubber and provided on the rear surface of the supporting member 11 as viewed in FIG. 3 (i.e.in the unfolded state). As will be seen in FIG. 6, when the supporting member 11 is unfolded outwardly and downwardly around the hinge connection 12, the rubber stoppers 15 bear against the body panel 1 of a motor vehicle, whereby the supporting member 11 can be held in the state separated and distanced from the body panel 1. Further formed in the supporting member 11 at a center portion thereof across the bent portion 16 is a retaining aperture 16 which serves to receive and retain the cap 3. More specifically, the retaining aperture 16 has a lower peripheral edge portion of an arcuate shape having a diameter corresponding to an outer diameter of the cylindrical cap 3 so that the latter can be placed in the retaining aperture from above as viewed in FIG. 6.

Figure 4:
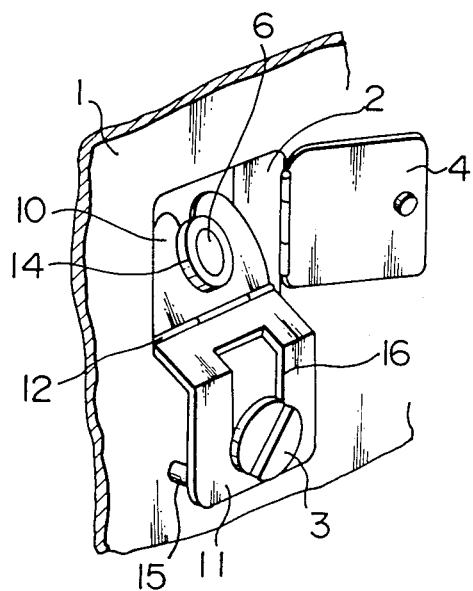
FIG. 4 is a fragmentary perspective view showing the protection assembly in the state being used.
Figure 6:
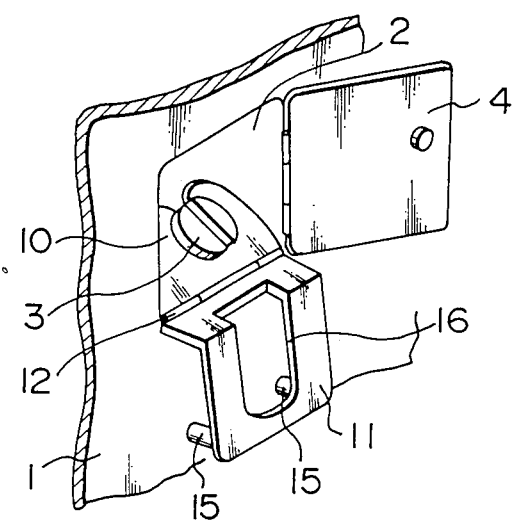
FIG. 6 is a perspective view showing the protection assembly in the state in which a supporting member constituting a part of the assembly is unfolded outwardly and downwardly.
Figure 7:
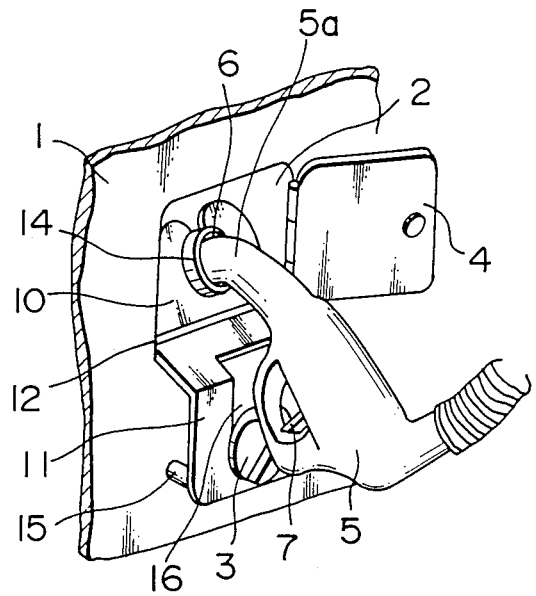
FIG. 7 is a perspective view showing a fueling pistol inserted in a fuel inlet port starting from the state shown in FIG. 6.

With the structure of the protection assembly described above, the fueling process for feeding fuel to an onboard fuel tank can be carried out in a manner described below. First, the cover member 4 is opened, as shown in FIG. 5, being followed by unfolding the supporting member 11 outwardly and downwardly until the stoppers 15 bear on the body panel of the motor car, as shown in FIG. 6. Subsequently, the cap 3 is removed from the fuel inlet port 6 and placed in the retaining aperture 16 formed in the supporting member 11, as is shown in FIG. 4. Subsequently, the nozzle 5a of the fueling pistol 5 is inserted into the inlet port 6 with the pistol body resting on the cap 16 retained by the supporting member 11, as is shown in FIG. 7. In this state, the fuel can be poured into the inlet port 6. It will now be appreciated that the fueling pistol 5 is positively prevented from striking directly on the body panel 1. The stopper 15 formed of an elastic material such as rubber can not injure the panel. Besides, since the cover member 4 can not be closed in the state in which the supporting member 11 is unfolded, man will never forget to fit the cap 3 onto the inlet port 6 after the refueling operation. In other words, the cover member 4 cannot be closed before the cap 3 is removed from the ratining aperture 18 with the supporting member 11 being subsequently folded over the base portion 10.

The protection assembly can be easily mounted on the cylindrical portion 14 defining the inlet port 6 and thus enjoy offhand application to the existing motor vehicles without need for any substantial modification of the fuel inlet port.

Figure 8:
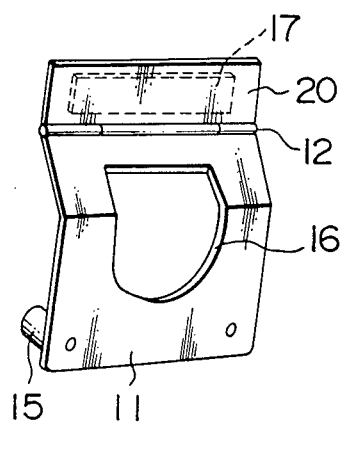
FIG. 8 is a perspective view showing a protection assembly according to another embodiment of the present invention.

FIG. 8 shows a structure of the protection assembly according to another embodiment of the invention which differs from the preceding structure in that a magnet 17 is fixedly secured to the rear surface of a base member denoted by 20. As will be readily seen, the protection assembly shown in FIG. 8 can be mounted within the recess 2 by making use of the attracting force of the magnet 17. In other respects, the structure shown in FIG. 8 is identical with that of the preceding embodiment. The cap 3 can be held in the retaining aperture 18 and the body of the fuel pistol 5 can be supported by the supporting member 11 at the cap 3 held therein. The structure shown in FIG. 8 can enjoy more universal application because the protection assembly can be easily mounted by means of the magnet 17 regardless of physical configuration of the inlet port member 14.

Figure 9:
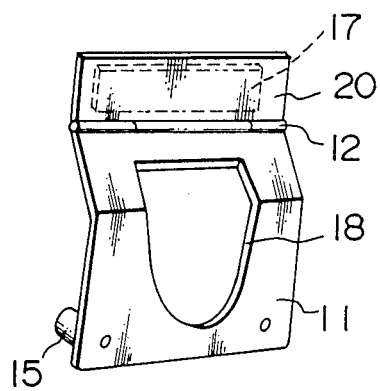
FIG. 9 is a persepctive view showing a protection assembly according to still another embodiment of the present invention.

FIG. 9 shows still another embodiment of the invention in which the supporting member 11 is formed with a tapered retaining aperture 18 for allowing the caps 3 of different diameters to be retained therein.

Although the invention has been described in conjunction with the illustrated embodiments, it should be understood that various modifications may readily occur to those skilled in the art without departing from the spirit and scope of the present invention.

What is claimed is:

1. A protection assembly for protecting a body panel as well as a fuel inlet port which is provided in the body panel of a motor vehicle and normally closed by a removable cap, comprising a base member destined to be placed internally in a recess formed in said body panel where said fuel inlet port is provided, said recess being usually covered by a cover member, a supporting member hinged to said base member so as to be unfoldably extended outwardly from said recess in the opened state thereof, said supporting member serving to support a tool used for fueling through said fuel inlet port, and a retaining portion formed in said supporting member and serving to hold said removable cap removed from said fuel inlet port during the refueling operation.

2. A protection assembly according to claim 1, wherein said supporting member is foldable about said hinged portion so as to be accommodated within said recess in the state overlaid on said base member.

3. A protection assembly according to claim 1, wherein said base member is of such a configuration as to be removably retained by a member constituting said fuel inlet port.

4. A protection assembly according to claim 1, wherein said supporting member is formed with a retaining aperture where said cap can be removably retained.

5. A protection assembly according to claim 1, wherein said supporting member has a rear surface provided with a pair of stopper means provided at locations in the vicinity of a free end of said supporting member, said stopper means bearing on said body panel with a predetermined gap defined between said body panel and said supporting member when said supporting member is unfoldably extended outwardly.

* * * * *